Patented Sept. 2, 1941

2,254,283

UNITED STATES PATENT OFFICE 2,254,283

PROCESS FOR PREPARING URETHANES

Wolfgang Gündel, Dessau in Anhalt, Germany, assignor, by mesne assignments, to Heberlein Patent Corporation, New York, N. Y., a corporation of New York No Drawing. Application February 27, 1939, Serial No. 258,731. In Germany April 8, 1938

7 Claims. (Cl. 260—482)

This invention relates to a process for producing urethanes, particularly higher molecular urethanes. More specifically the invention relates to the production of urethanes by reacting cyclic or acyclic organic esters of chlorcarbonic acid with ammonia-generating ammonium salts.

The urethanes obtained in accordance with this process are valuable intermediate products in the preparation of a variety of commercially valuable chemical compounds. The higher molecular urethanes are especially suitable for the preparation of textile assistants, for example, in rendering textiles as well as other materials water-repellent. They are also suitable for use in the preparation of tanning agents, insecticides; and numerous other chemicals.

As raw materials in the process of the instant invention chlorcarbonic acid esters of all types can be used. These esters can be obtained according to known procedures as from phosgene. In preparing the raw materials for the practice of the preferred embodiment of the invention, phosgene is reacted with higher molecular alcohols to give esters. As examples of raw materials one can use chlorcarbonic acid esters of aliphatic alcohols, such as, propyl alcohol, and especially the higher molecular compounds including hexyl alcohol, dodecyl alcohol, hexadecyl alcohol, octadecyl alcohol, octadecenyl alcohol, hydroxyoctadecenyl alcohol; cyclic alcohols such as cyclohexanol, methylcyclohexanol, higher molecular alkyl substituted cyclohexanols, naphthenyl alcohols; abietyl alcohol, and other resin alcohols; benzyl alcohol, phenols and naphthols, higher molecular alkyl phenols and naphthols, and like alcohols. The hydrocarbon radicals of these chlorcarbonic acid esters may be interrupted by or contain heteroatoms or heteroatomic groups, such as oxygen, sulfur, and the like, or atomic groups containing these atoms, as, for example, hydroxyl radicals and ester radicals.

In accordance with the process of the invention these chlorcarbonic acid esters are reacted with ammonium salts which give off ammonia especially those derived from weak acids, such as ammonium carbonate, ammonium acetate, and the like. In this reaction the chlorine atom of the various esters is substituted by a NH$_2$ radical and the urethanes are formed. Although a solvent may be used in connection with the reaction, one of the advantages of the process is that it does not require its use. Similarly the use of a gas-forming reaction component is not essential.

In the production of higher molecular urethanes in accordance with the preferred embodiment of the invention, a higher molecular alkyl ester of chlorcarbonic acid is heated to a high temperature, a powdered ammonium salt of the nature hereinbefore described is gradually added, the heating preferably continued to a higher temperature until the reaction is complete. The temperatures used vary somewhat with the specific raw materials employed.

The invention will be clearly understood from, but is not restricted to, the following example wherein the parts are expressed in parts by weight.

Example

One hundred parts of chlorcarbonic acid octadecyl ester are heated to 90° to 100° C. in a vessel provided with a stirrer. Then while stirring 40 parts of finely ground ammonium carbonate are slowly added in portions. Near the end of the reaction period the temperature is raised to 120° C. The reaction goes to completion. The reaction material is then dissolved in a suitable solvent for the octadecyl urethane, whereby the inorganic salt precipitates after which it is filtered out and the solution evaporated to recover the urethane. If it is desired to obtain the octadecyl urethane in a purer state, the reaction product is dissolved in 300 parts of alcohol, filtered and crystallized after filtration. The octadecyl urethane can be also freed from the inorganic materials simply by washing with water.

It should be understood that the present invention is not limited to the specific materials, compounds, and their uses as herein disclosed, but that it extends to all equivalents which one skilled in the art would consider within the purport of the instant disclosure and within the scope of the claims.

Instead of the chlorcarbonic acid esters in general the halogen carbonic acid esters are applicable as bromo- and iodocarbonic acid esters.

I claim:

1. Process for preparing higher molecular urethanes which comprises heating a higher molecular chlorcarbonic acid ester and adding thereto a finely divided ammonium salt of a weak acid which liberates ammonia under the conditions of the reaction and continuing the reaction under heat until the reaction goes substantially to completion.

2. Process for preparing octadecyl urethanes which comprises heating a chlorcarbonic acid ester of octadecyl alcohol with an ammonium salt of a weak acid which liberates ammonia at the temperature of the reaction until the reaction goes substantially to completion.

3. The process for preparing urethanes which comprises reacting a chlorcarbonic acid ester with an ammonium salt of a weak acid which delivers ammonia under the conditions of the reaction.

4. The process for producing urethanes from a higher molecular ester of chlorcarbonic acid which comprises heating said ester with ammonium carbonate at a temperature which liberates ammonia and continuing the heating until the reaction goes to substantial completion.

5. The process for producing urethanes from a higher molecular ester of chlorcarbonic acid which comprises heating said ester with ammonium acetate in the absence of a solvent at a temperature which liberates ammonia and continuing the heating until the reaction goes to substantial completion.

6. The process of producing urethanes unsubstituted on the nitrogen atom which comprises reacting an ester of chlorcarbonic acid with an ammonium salt of a weak acid which liberates ammonia under the reaction conditions, said reaction taking place in the absence of solvents.

7. The process for preparing urethanes which comprises reacting a halocarbonic acid ester with an ammonium salt of a weak acid, which delivers ammonia under the conditions of the reaction.

WOLFGANG GÜNDEL.